United States Patent

[11] 3,598,038

| [72] | Inventors | John F. Maher<br>Enfield;<br>William A. Watson, Vernon, both of, Conn. |
|---|---|---|
| [21] | Appl. No. | 878,733 |
| [22] | Filed | Nov. 21, 1969 |
| [45] | Patented | Aug. 10, 1971 |
| [73] | Assignee | United Aircraft Corporation<br>East Hartford, Conn. |

[54] FLUID DAMPER AND NOISE ATTENUATOR
5 Claims, 1 Drawing Fig.

| [52] | U.S. Cl. | 98/1.5 |
|---|---|---|
| [51] | Int. Cl. | B64d 13/04 |
| [50] | Field of Search | 98/1.5; 251/37, 120; 137/472, 473, 474, 475, 476, 477, 478 |

[56] References Cited
UNITED STATES PATENTS
3,272,608  9/1966  Andresen, Jr. ............... 98/1.5

OTHER REFERENCES

"Pressure Cabin Investigations, Phase I," Aircarft Branch Report, Air Corps Technical Report No. 4220, Vol. VIII, No. 710, Oct. 1, 1937, pps. 9, 6 and 10. Copy in Group 345 (98/1.5)

*Primary Examiner*—Meyer Perlin
*Assistant Examiner*—W. C. Anderson
*Attorney*—Laurence A. Savage ABSTRACT: A fluid valve in which flutter of the pressure-responsive member is eliminated is provided with a tube with holes in the wall thereof in the outlet area of the valve to reduce pressure fluctuations on the undersurface of the pressure-responsive member.

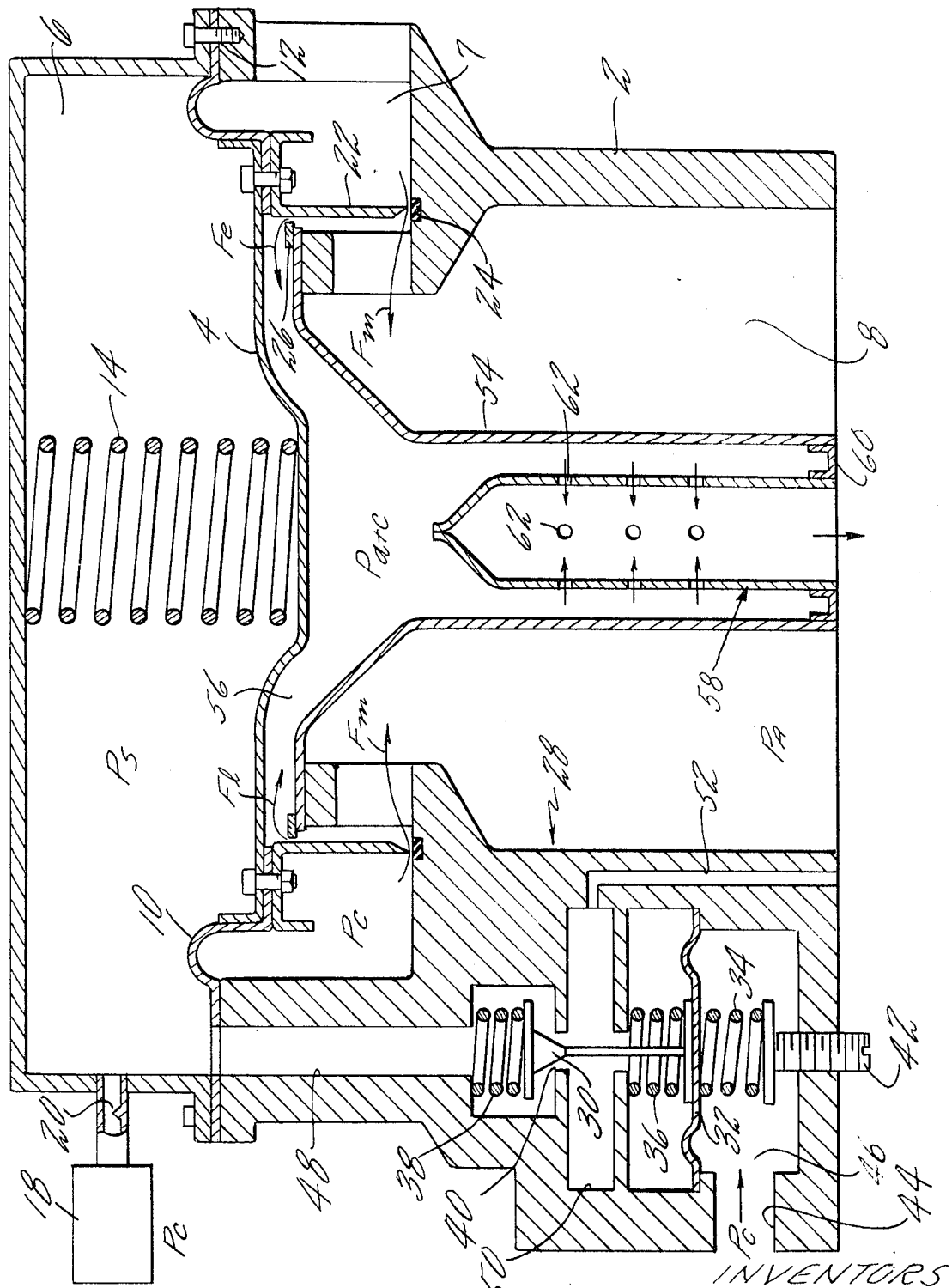

FLUID DAMPER AND NOISE ATTENUATOR

BACKGROUND OF THE INVENTION

1. Field of the Invention

This invention relates to fluid valves and particularly to a fluid damper and noise attenuator therefor.

2. Description of the Prior Art

One type of fluid valve known in the art is an aircraft cabin pressure valve of the type in which the valve piston is controlled by cabin pressure and ambient pressure on one side of the piston and by servocontrol pressure on the other side of the piston. During operation of the valve, the discharge of the cabin air into the area of the ambient pressure generates perturbations in the ambient pressure region surrounding the outflow deflector, which causes the piston and the gate to flutter, thereby generating noise in the cabin in the form of a low frequency hum. This flutter is undesirable, moreover, because it causes the valve to be unstable, and furthermore, it could eventually lead to destruction of the valve through fatigue because of the excessive vibration of the moving parts of the valve. Our invention eliminates the flutter of the gate and piston and, therefore the noise, and thereby increases the life of the valve.

SUMMARY OF THE INVENTION

An object of the present invention is to eliminate the requirement of critical sizing of the outflow deflector discharge area to avoid fluctuations in the pressure-responsive valve member, while still maintaining stability of the valve.

Another object of the present invention is to eliminate any disturbances on the underface of the pressure-responsive valve member.

Another object of the present invention is to eliminate frequency noise and gate fluctuations in fluid valves.

Another object of the present invention is to reduce the amount of motion of the moving parts of the valve, thereby providing for a valve of long life.

A fluid valve according to the present invention, which attains the above objects and others, is provided by the combination of a pressure-responsive valve member, which may be a piston having a flexible diaphragm disposed on its periphery and a gate valve disposed on the surface of the piston. The piston-diaphragm combination is disposed in a housing and divides the housing into two compartments. An outflow deflector may be disposed downstream of the gate and beneath the piston in the outlet of the valve. One side of the piston-diaphragm combination is exposed to a control pressure $P_S$. The opposite side of the piston-diaphragm combination is exposed to cabin pressure and to the pressure which results when the gate valve is opened, $P_{a+c}$. Flutter is eliminated by maintaining the pressure $P_{a+c}$ on the opposite side of the piston-diaphragm combination and within the outflow deflector substantially constant; that is, to maintain a pressure which does not vary sharply with time when the gate valve is opened to regulate the controlled pressure, $P_c$, from going above a predetermined limit.

Our invention is directed to maintaining the combined pressure, $P_{a+c}$, substantially constant. This feature is provided by means for destroying the turbulence in and about the outflow deflector of the valve. The essence of our invention is a tube which is disposed within the outflow deflector and, therefore, in the chamber adjacent the side of the piston and gate valve in which the pressure is $P_{a+c}$; the tube has at least one set of holes in the wall thereof. The requirements of the sizing of the tube cross-sectional area and the sum of the areas of the holes in the wall thereof is that both areas be approximately equal and sufficient to pass the flow of air which can pass between the gate valve and its guide into the interior of the outflow deflector. In other words, the areas must be sufficient to prevent a pressure build up within the interior of the outflow deflector. By sizing the tube in this manner, the pressure within the outflow deflector is less than the ambient pressure outside the outflow deflector because of the suction effect at the end of the deflector. It is desirable to maintain the length of the tube as long as possible in any particular design but not extending substantially beyond the surface of the housing. The end of the tube adjacent the piston is closed. The holes in the wall of the tube serve to diffuse pressure perturbations emanating in the ambient atmosphere and passing up through the tube and into the interior of the outflow deflector or the perturbations resulting from the flow passing between the gate valve and its guide when the gate valve is open which would, in the absence of the present invention, react on the moving piston, causing fluctuation of the piston and gate and the resultant noise and wear.

The foregoing and other objects, features and advantages of the present invention will become more apparent in light of the following detailed description of a preferred embodiment thereof as illustrated in the accompanying drawing.

DESCRIPTION OF THE DRAWING

The sole FIGURE is a sectioned elevation of a fluid valve in accordance with our invention.

DESCRIPTION OF THE PREFERRED EMBODIMENT

Referring now to the FIGURE, there is shown a fluid valve in accordance with the present invention having a housing 2 with a movable piston 4 disposed therein dividing the housing into chambers 6, 7 and 8. Disposed on the periphery of the piston 4 is a flexible diaphragm 10 which is fixed to the housing as shown at 12. A spring 14 may be interposed between the housing 2 and the movable piston 4 for biasing the piston. Fluid is introduced into the chamber 6 via a porous filter 18 which is disposed in the aircraft cabin, and a fixed orifice 20.

A gate valve 22 is disposed on the piston 4 and has a knife edge for seating with a seat 24 and a guide 26.

The gate valve is opened when the pressure $P_c$ goes above a predetermined limit. Valve means shown generally by the numeral 28, are provided for reducing the pressure in the chamber 6 when the pressure $P_c$ goes above the predetermined limit. The valve means may comprise a poppet 30 operatively connected to a flexible diaphragm 32 for movement therewith. Springs 34, 36 and 38 are utilized to normally close the poppet 30 on its seat and to set the limit of $P_c$ above which the poppet will open. An adjusting screw 42 may be provided for adjustment of the predetermined limit of the pressure, $P_c$. An inlet 44 is provided for the chamber 46 and fluid at pressure $P_c$ is fed into the chamber from an aircraft cabin (or whatever sort of enclosure it is desired to control the pressure in). When the pressure $P_c$ goes above the predetermined limit as set by the springs, the diaphragm 32 will move, thereby opening the poppet valve 30 and allowing fluid in the chamber 6 to flow through passage 48, into the chamber 50, and on to the ambient atmosphere through passage 52. When the pressure $P_s$ on the upper side of the piston-diaphragm combination is reduced, the diaphragm-piston combination will move upwards, moving the gate valve 22 with it, and thereby allow the fluid in the cabin to be discharged to the ambient atmosphere as shown by the arrow $F_m$.

A funnel-shaped outflow deflector 54 may be disposed within the chamber 8 for guiding the discharged fluid. A portion of the discharged fluid will pass into the interior chamber 56 of the outflow deflector 54 between the gate valve 22 and the guide 26 as shown by the arrow $F_1$.

A tube 58 is disposed within the outflow deflector and may be structurally connected thereto in any well-known manner, such as by being bonded to a ring which is bonded to the wall of the outflow deflector as shown at 60. The tube 58 has holes 62 in the wall thereof. While one set of holes is sufficient, it has been found that optimum results will be obtained by the use of at least two sets of holes opposing each other.

The fluid which has leaked into the chamber 56 passes through the holes 62 and this fluid stabilizes the pressure fluctuations. Therefore, an essentially stable pressure is provided across the lower surface of the piston 4, thereby eliminating flutter of the piston-diaphragm and the gate valve.

There has thus been described a preferred embodiment of a fluid valve in accordance with our invention. While an aircraft cabin has been described as the enclosure, the pressure of which the valve controls, and while a cabin pressure valve has been shown to describe the invention, it will be obvious to those skilled in the art that our invention has utility to damp the fluctuations and reduce the noise in any valve which has a sensitive pressure-responsive surface which is subject to fluctuating pressures. Therefore, it should be understood that various changes and omissions in the form and detail thereof may be made therein without departing from the spirit and scope of the invention.

What we claim as novel and desire to be secured by Letters Patent of the United States is:

1. A fluid valve for controlling the pressure in an enclosure, comprising:
   a valve housing;
   a pressure-responsive member disposed within said housing and dividing said housing into a first chamber and a second chamber said first chamber being exposed to a servo pressure and said second chamber being exposed to ambient pressure and to the pressure in the enclosure
   a valve seat disposed in said housing;
   a valve member disposed on said pressure-responsive member for movement therewith and projecting towards said valve seat and movable to an open and closed position for discharging air from said enclosure to ambient;
   means for reducing the pressure in said first chamber when the pressure in the enclosure goes above a predetermined limit;
   a hollow outflow deflector fixed centrally of said valve member disposed in said second chamber downstream of said valve member;
   a tube disposed in said hollow outflow deflector, said tube having the least one set of holes in the wall thereof, the sum of the areas of the holes being approximately equal to the cross-sectional area of said tube, said tube having a closed end adjacent said pressure responsive member and an open end exposed to the ambient atmosphere; and
   air bleed means defined by said hollow outflow deflector adjacent said valve member communicating a portion of said discharging air to ambient via said holes.

2. In combination with a fluid valve for regulating the pressure in an enclosure of the type having a casing, a pressure-responsive circular member disposed in said casing and exposed to fluctuations in pressure, a valve member attached to the pressure-responsive member opens and closes for discharging flow from the enclosure for regulating the pressure in the enclosure, and wherein the pressure-responsive member is controlled by a servo pressure on one surface thereof and by ambient pressure and the pressure of the enclosure on the opposite surface thereof, a hollow outflow deflector member secured centrally of said fluid valve having a larger diameter portion spaced from said movable member and a smaller diameter extension portion extending into the discharge end of said fluid valve, the outer peripheral end of said larger diameter portion being slightly spaced from said valve member to allow a small portion of said discharge flow to egress into the hollow portion of said hollow outflow deflector member, the improvement comprising:
   a tube disposed in said hollow portion of said funnellike shaped member, said tube having at least one row of holes in the wall thereof, the end of the tube adjacent the pressure-responsive member being closed and the opposite end open to ambient atmosphere, whereby said small portion of said discharge flow discharges through said holes to ambient and pressure disturbances acting on the surface of the pressure-responsive member are eliminated.

3. A fluid valve as claimed in claim 2 wherein said hollow outflow deflector member is generally shaped as a funnel.

4. A fluid valve as claimed in claim 3, wherein said tube is secured to one end of said outflow deflector member.

5. A fluid valve as claimed in claim 4 including securing means supporting said tube concentrically in said outflow deflector member and defining a closure, said tube being spaced from the wall of said deflector member for defining an annular flow path.